(12) United States Patent
Abhyankar et al.

(10) Patent No.: US 11,195,050 B2
(45) Date of Patent: Dec. 7, 2021

(54) MACHINE LEARNING TO GENERATE AND EVALUATE VISUALIZATIONS

(71) Applicant: MicroStrategy Incorporated, Vienna, VA (US)

(72) Inventors: Saurabh Abhyankar, McLean, VA (US); Glenn Boysko, Vienna, VA (US); Scott Rigney, Vienna, VA (US); Timothy Lang, Vienna, VA (US)

(73) Assignee: MicroStrategy Incorporated, Vienna, VA (US)

( * ) Notice: Subject to any disclaimer, the term of this patent is extended or adjusted under 35 U.S.C. 154(b) by 0 days.

(21) Appl. No.: 16/731,778

(22) Filed: Dec. 31, 2019

(65) Prior Publication Data

US 2020/0250472 A1    Aug. 6, 2020

Related U.S. Application Data

(60) Provisional application No. 62/801,320, filed on Feb. 5, 2019.

(51) Int. Cl.
*G06K 9/62* (2006.01)
*G06N 20/00* (2019.01)
(Continued)

(52) U.S. Cl.
CPC ......... *G06K 9/6253* (2013.01); *G06K 9/6218* (2013.01); *G06K 9/6257* (2013.01);
(Continued)

(58) Field of Classification Search
CPC ... G06T 11/206; G06T 11/60; G06T 2200/24; G06K 9/6253; G06K 9/46; G06K 9/6218; G06K 9/6269; G06K 9/6267; G06N 20/00
See application file for complete search history.

(56) References Cited

U.S. PATENT DOCUMENTS 5,414,469 A    5/1995 Gonzales et al.
6,701,294 B1   3/2004 Ball et al.
(Continued)

OTHER PUBLICATIONS

U.S. Office Action in U.S. Appl. No. 15/955,541, dated Oct. 8, 2019, 10 pages.
(Continued)

*Primary Examiner* — Todd Buttram
(74) *Attorney, Agent, or Firm* — Fish & Richardson P.C.

(57) ABSTRACT

Methods, systems, and apparatus, including computer programs encoded on computer-readable storage media, for machine learning to generate and evaluate visualizations. In some implementations, a system determines properties of a dataset. The system generates visualization specifications that each define a different visualization for the dataset, wherein the visualization specifications specify different subsets of the dataset being illustrated with different visualization formats. The system evaluates the visualization specifications using a machine learning model trained based on user feedback for visualizations for multiple datasets. The system selects a subset of the visualization specifications based on output of the machine learning model. The system provides, for display, visualization data for the subset of visualization specifications that were selected based on the output of the machine learning model.

21 Claims, 7 Drawing Sheets

(51) Int. Cl.
 *G06N 5/04* (2006.01)
 *G06T 11/20* (2006.01)
 *G06T 11/60* (2006.01)

(52) U.S. Cl.
 CPC ............ *G06K 9/6269* (2013.01); *G06N 5/04* (2013.01); *G06N 20/00* (2019.01); *G06T 11/206* (2013.01); *G06T 11/60* (2013.01); *G06T 2200/24* (2013.01)

(56) References Cited

U.S. PATENT DOCUMENTS

| | | | |
|---|---|---|---|
| 7,181,444 B2 | 2/2007 | Porter et al. | |
| 7,373,292 B1 | 5/2008 | Coyne et al. | |
| 8,402,052 B2 | 3/2013 | Sano et al. | |
| 8,495,627 B2 | 7/2013 | Barsness et al. | |
| 8,996,523 B1 | 3/2015 | Fisher | |
| 9,129,448 B2 | 9/2015 | Bekmambetov et al. | |
| 9,411,853 B1 | 8/2016 | Dovrtel et al. | |
| 10,007,708 B2* | 6/2018 | Moser | G06F 16/248 |
| 10,108,676 B2 | 10/2018 | Li | |
| 10,255,320 B1* | 4/2019 | Cappiello | G06F 16/245 |
| 10,846,318 B1 | 11/2020 | McNabney et al. | |
| 2002/0032676 A1 | 3/2002 | Reiner et al. | |
| 2003/0233403 A1 | 12/2003 | Bae et al. | |
| 2004/0165780 A1 | 8/2004 | Maki et al. | |
| 2005/0050036 A1 | 3/2005 | Araki | |
| 2005/0187977 A1 | 8/2005 | Frost | |
| 2006/0155687 A1 | 7/2006 | Chou | |
| 2006/0155688 A1 | 7/2006 | Chou | |
| 2006/0227970 A1 | 10/2006 | Nakano | |
| 2007/0130131 A1 | 6/2007 | Porter et al. | |
| 2007/0245383 A1 | 10/2007 | Bhide et al. | |
| 2009/0058860 A1 | 3/2009 | Fong et al. | |
| 2009/0104123 A1 | 4/2009 | Yang et al. | |
| 2009/0112949 A1 | 4/2009 | Ergan et al. | |
| 2011/0040733 A1 | 2/2011 | Sercinoglu et al. | |
| 2012/0084296 A1 | 4/2012 | Waters | |
| 2012/0136649 A1 | 5/2012 | Freising et al. | |
| 2012/0179714 A1 | 7/2012 | Chandhok et al. | |
| 2012/0226804 A1 | 9/2012 | Raja et al. | |
| 2013/0013552 A1 | 1/2013 | Eshleman et al. | |
| 2013/0018903 A1 | 1/2013 | Taranov | |
| 2014/0195558 A1 | 7/2014 | Murthy et al. | |
| 2014/0280372 A1 | 9/2014 | Huras et al. | |
| 2014/0365429 A1 | 12/2014 | Wagner et al. | |
| 2015/0006518 A1 | 1/2015 | Baumgartner et al. | |
| 2015/0169688 A1 | 6/2015 | Halverson et al. | |
| 2015/0178052 A1 | 6/2015 | Gupta et al. | |
| 2015/0193719 A1 | 7/2015 | Than et al. | |
| 2015/0317362 A1 | 11/2015 | Teranishi | |
| 2015/0355989 A1 | 12/2015 | Hayden et al. | |
| 2016/0048584 A1 | 2/2016 | Valentin | |
| 2016/0154852 A1 | 6/2016 | Chen et al. | |
| 2017/0039281 A1 | 2/2017 | Venkata et al. | |
| 2017/0206684 A1* | 7/2017 | Duncker | G06F 40/106 |
| 2018/0024901 A1* | 1/2018 | Tankersley | G06F 16/2379 707/694 |
| 2019/0102921 A1* | 4/2019 | Mittal | G06F 16/248 |
| 2019/0121802 A1 | 4/2019 | Venkataraman et al. | |
| 2020/0211692 A1* | 7/2020 | Kalafut | G06N 20/00 |
| 2020/0401299 A1* | 12/2020 | Hafertepen | G06F 3/0482 |

OTHER PUBLICATIONS

U.S. Final Office Action in U.S. Appl. No. 15/955,541, dated Mar. 2, 2020, 12 pages.

* cited by examiner

FIG. 4

MACHINE LEARNING TO GENERATE AND EVALUATE VISUALIZATIONS

CROSS-REFERENCE TO RELATED APPLICATION

This application claims the benefit of U.S. Provisional Patent Application No. 62/801,320, filed on Feb. 5, 2019, the entirety of which is incorporated by reference herein.

BACKGROUND

The present specification relates to machine learning techniques for generating and evaluating visualizations.

Individuals and organizations increasingly rely on collections of data to plan and make decisions. Databases, spreadsheets, and other types of data repositories often include useful information that is not easily understandable to a user. Visualizations such as charts and graphs can express and emphasize important aspects of a dataset. However, generating an effective visualization can require a significant amount of work and even iterative trial and error. Different users have different preferences and expectations when generating or viewing a visualization, which makes creating an effective visualization difficult. In addition, datasets can have widely varying types and amounts of data, and so different types of visualizations are often needed for different datasets.

SUMMARY

In some implementations, a computing system can use machine learning techniques to identify which subsets of dataset are most significant and which visualization formats would best represent the identified subsets of data. The system can include a machine learning model trained based on implicit or explicit preferences of users. For example, the model can be trained based on preference data that reflects actions of users in response to the presentation of different visualizations generated from various different data sets. Through the training process, the model can learn to judge the relative merit of different visualizations given the properties of the datasets from which the visualized data was obtained. The model can then be used to predict, for different types of datasets and even for arbitrary datasets, which subsets of data should be represented visually and which formats are best to illustrate the subsets of data.

As an example, the system can be configured to receive a dataset and determine properties of the dataset. The system can also define multiple candidate visualizations with varying characteristics. For example, the candidate visualizations may be of different types (e.g., bar chart, line graph, scatterplot, and so on), may show different subsets of data from the dataset, may have different formatting characteristics, and so on. Data defining candidate visualizations and data indicating the property of the dataset can be provided to a trained machine learning model that has been trained to evaluate the quality of the candidate visualizations. For example, the trained machine learning model can be one that has learned user preferences from training data that indicates explicit and/or implicit user feedback for visualizations representing different datasets. The outputs of the trained machine learning model can then be used to select a subset of the candidate visualizations that are predicted to be most appropriate for the dataset (e.g., given the properties of the specific dataset under analysis). The selected visualizations can be provided to a user, for example, as recommended visualizations available for the user to insert into a report, dashboard, or other document the user is creating.

The process of predictively generating and evaluating visualizations can take into account the context of a user's computing device. For example, a user may select certain portions or aspects of a dataset, such as a particular column, container, or object. The system may receive information indicating these selections and use them to re-score or filter the candidate visualizations. For example, if a user has selected a particular column of data and the user then interacts with a control to provide suggested visualizations, the system can apply a weight to boost the machine learning model's scores for candidate visualizations that illustrate or involve that column of data. As another example, the system may use current selections on the user interface as a filter, to avoid providing visualizations for display if the visualizations are not related to the currently selected aspects on the user interface. In some implementations, contextual information such as recent user actions or active selections on a user interface may be among the data input to the trained machine learning model, allowing the model to directly generate its scores based on context.

Predictions generated using the machine learning model can be further enhanced by personalizing the predictions for specific users, roles, organizations, and/or contexts. For example, the trained machine learning model may provide a general scoring of candidate visualizations, and information about the user can be used to further refine scoring and selection of candidate visualizations. The system can identify a user and retrieve data indicating the user's role in an organization, the user's preferences or profile, as well as a history of actions performed by the user. With this information, the system can bias the scoring and selection toward the topics most likely to be of interest to the user, based on previous actions of the user or other factors. As a result, two users of the system may be provided different sets of visualizations for the same dataset. Given a dataset about sales of computer components, for example, the visualization predicted to be most relevant for a user in an engineering role may be a map showing component volume for different geographic regions, while the visualization predicted to be most relevant for a user in a finance role may be a chart of total sales over time.

In some implementations, the properties of datasets used to generate predictions include statistical or structural characteristics of the dataset, such as a number of columns, a range of values in each column, data types for each column, statistical measures for values in the columns, and so on. Predictions generated using these characteristics can allow the trained machine learning model to be highly accurate at isolating key portions of a dataset and selecting the most appropriate visualizations to illustrate them. Other information about a dataset can be used in training and in generating predictions, such as labels and other metadata. Nevertheless, using these types of objective, structural properties describing the makeup of the dataset can allow for high accuracy even without data indicating specific semantic meanings of the data.

Effectiveness of the machine learning model can be enhanced by using training data that includes at least some examples of user feedback for randomly selected types of visualizations and randomly generated datasets. One benefit is that it enhances the scope and coverage of the training data and consequently improves the robustness of the predictions of the model across datasets of varying types and content. User feedback obtained for randomly generated data and visualizations can relate specifically to the presentation attributes of the visualizations (e.g., scale, formatting, overall aesthetic value, etc.) rather than the semantic meaning of underlying data. Training with this data can allow the model to learn predictive ability that is not dependent on semantic classification of the dataset. As a result the model can generate predictions from directly observable properties of the data, which enhances the versatility of the system to operate with wide varieties of datasets having content that is not known at the time of training. Similarly, it enables the model to be robust enough to provide useful predictions even when labels or other metadata is missing, incorrect, or provided in a non-standard format.

To increase responsiveness and performance of the system, candidate visualizations can be defined and evaluated using the trained machine learning model in advance. For example, when a dataset is imported, opened, or selected by a user, the system can initiate the process of determining properties of the dataset as well as scoring and ranking candidate visualizations. This process can operate in the background, often at a server system, before the user indicates that any visualizations are desired. Once a user does access functionality to display relevant visualizations, the selected visualizations can be provided with very low latency since the visualizations have already been defined and selected. In some implementations, the selected visualizations can even be pre-rendered or cached in advance to further minimize delay in providing the information.

In one general aspect, a method performed by one or more computers includes: determining properties of a dataset; generating visualization specifications that each define a different visualization for the dataset, where the visualization specifications specify different subsets of the dataset being illustrated with different visualization formats; evaluating the visualization specifications using a machine learning model trained based on user feedback for visualizations for multiple datasets; selecting a subset of the visualization specifications based on output of the machine learning model; and providing, for display, visualization data corresponding to the subset of visualization specifications selected based on the output of the machine learning model.

In some implementations, determining properties of the dataset includes determining structural properties of the dataset including at least one of a number of columns, a number of attributes, a number of metrics, a value for an aggregation for a data range, a span of values for a data range, a data type for a data range, or a statistical measure for a data range.

In some implementations, determining properties of the dataset includes determining semantic properties of the dataset.

In some implementations, the different visualization formats comprise different visualization types including two or more from the group consisting of a graph, a line chart, a bar chart, a pie chart, a scatterplot, a heat map, a geographical map, a word-size map, a bubble chart, a hierarchy chart, a waterfall chart, a radar chart, a statistical chart, and an area chart.

In some implementations, the trained machine learning model has been trained to output scores indicating a level of the usefulness of visualizations. The scores can be conditioned on properties of the datasets from which the visualizations are derived. The machine learning model can be configured to generate the scores based on input indicating visualization properties and dataset properties. The trained machine learning model can be one that has been trained based on user feedback data indicating actions of multiple users after being presented visualizations representing portions of different datasets.

In some implementations, the user feedback data includes survey responses indicating ratings that users applied to visualizations.

In some implementations, the user feedback data includes usage data including measures of user behavior, other than rating of visualizations, in response to the presentation of the visualizations.

In some implementations, the usage data includes at least one of: a number of times a visualization was viewed, interacted with, shared, or included in a document by one or more users; or an amount of time that a visualization was viewed or interacted with by one or more users.

In some implementations, evaluating the visualization specifications includes: for each of the visualization specifications: providing, to the trained machine learning model, input that indicates (i) properties of a visualization and (ii) properties of the dataset; and receiving, as output of the trained machine learning model, a score for the visualization. Selecting a subset of the visualization specifications includes: ranking the visualization specifications based on the scores provided as output of the machine learning model; and selecting a highest-ranking subset of the visualization specifications.

In some implementations, the method includes receiving data indicating interaction with a control on a user interface. Providing the visualization data is performed in response to receiving the data indicating the interaction with the control on the user interface. Evaluating the visualization specifications using the machine learning model is performed before receiving the data indicating the interaction with the control.

In some implementations, the method includes determining a portion of the data set that has been selected using the user interface. Selecting the subset of the visualization specifications includes filtering the visualization specifications to exclude one or more visualization specifications that do not represent the selected portion of the data set.

Determining that a portion of the data set has been selected includes determining that a column of the data set has been selected; and selecting the subset of the visualization specifications includes selecting only visualization specifications that are generated from or provide information regarding the selected column.

In some implementations, the machine learning model includes an artificial neural network, a classifier, a support vector machine, a decision tree, a regression model, a clustering model, a Gaussian process model, a genetic algorithm, or a reinforcement learning model.

In some implementations, the method includes identifying a user of a computing device. Selecting the subset of the visualization specifications is personalized based on the identity of the user of the computing device. Providing the visualization data includes providing the visualization data to the computing device for display by the computing device.

In some implementations, selecting the subset of the visualization specifications includes: determining scores for the visualization specifications based on output of the machine learning model; weighting one or more of the scores based on the identity of the user to obtain a set of weighted scores for the visualization specifications; and selecting the subset of the visualization specifications based on the weighted scores.

In some implementations, the method includes identifying one or more topics based on a role of the user, a user profile for the user, or a usage history for the user. Selecting the subset of the visualization specifications is personalized by adjusting scores for the visualization specifications to indicate increased relevance for visualization specifications associated with the one or more topics.

In some implementations, the method includes determining, based on a usage history for the user, one or more visualization formats with which the user previously interacted. Selecting the subset of the visualization specifications is personalized by adjusting scores to indicate increased relevance for visualization specifications specifying visualization formats that have at least a minimum level of similarity to the one or more visualization formats with which the user previously interacted.

In some implementations, the selection of the visualization specifications is personalized based on a data type, a keyword, a visualization type, a query, or a topic indicted by usage data for the user.

In some implementations, the data set is a structured data set.

In some implementations, the structured data set includes a spreadsheet, a data cube, or a relational database.

In some implementations, generating the visualization specifications includes: identifying a number of attributes and/or metrics indicated by the dataset; identifying a number of different visualization formats that are each based on one or more of the attributes and/or metrics; and generating a visualization specification for each possible combination of the visualization formats and attributes and/or metrics indicated by the dataset.

Other embodiments of these aspects include corresponding systems, apparatus, and computer programs encoded on computer storage devices, all of which can be configured to perform the actions of the methods. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

FIGS. 3-5 are diagrams illustrating examples of user interfaces for an application that provides predictively generated visualizations.

Like reference numbers and designations in the various drawings indicate like elements.

DETAILED DESCRIPTION

Figure 1A:
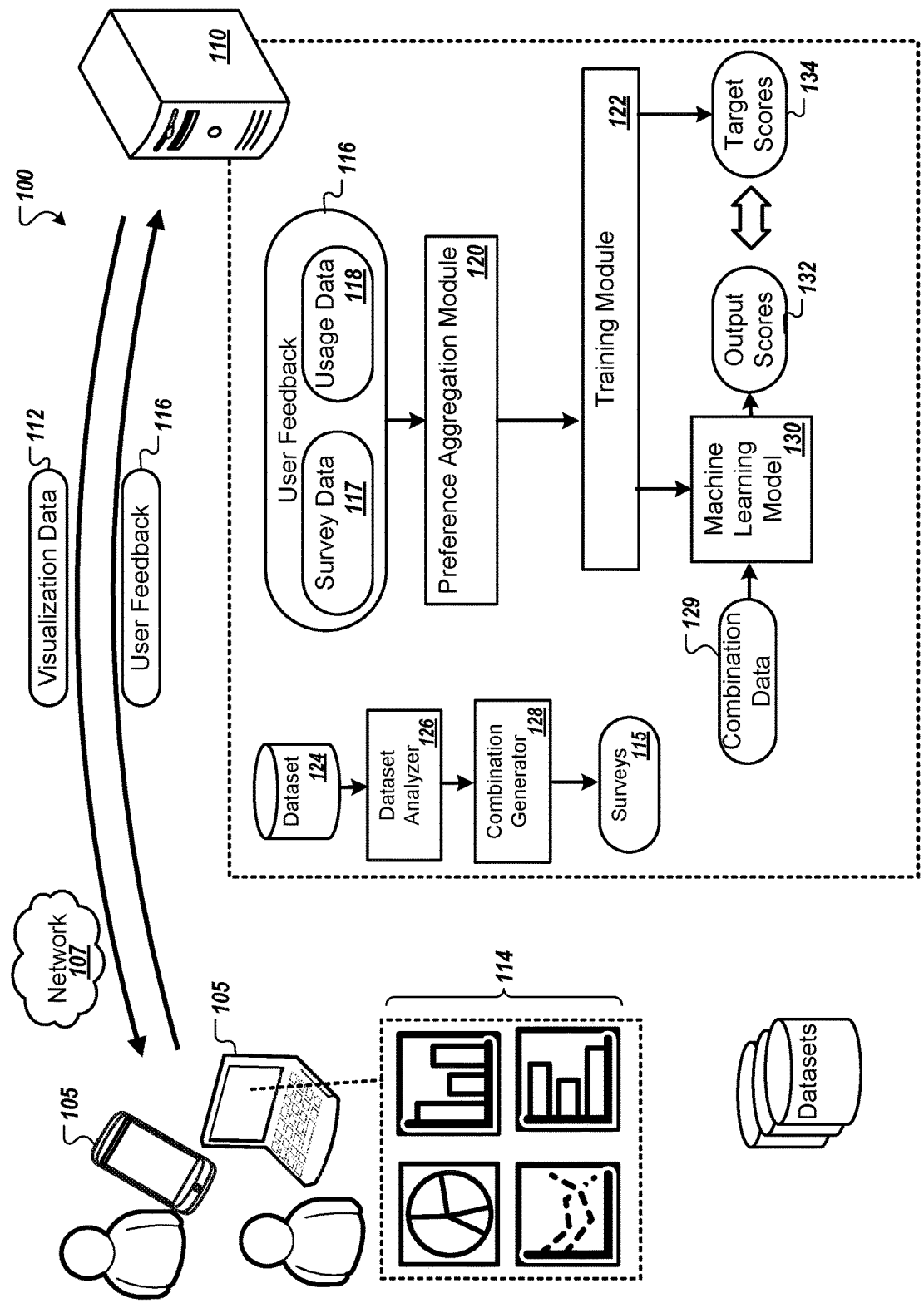
FIGS. 1A-1B are diagrams showing examples of a system that can use machine learning to generate and evaluate visualizations.
Figure 1B:
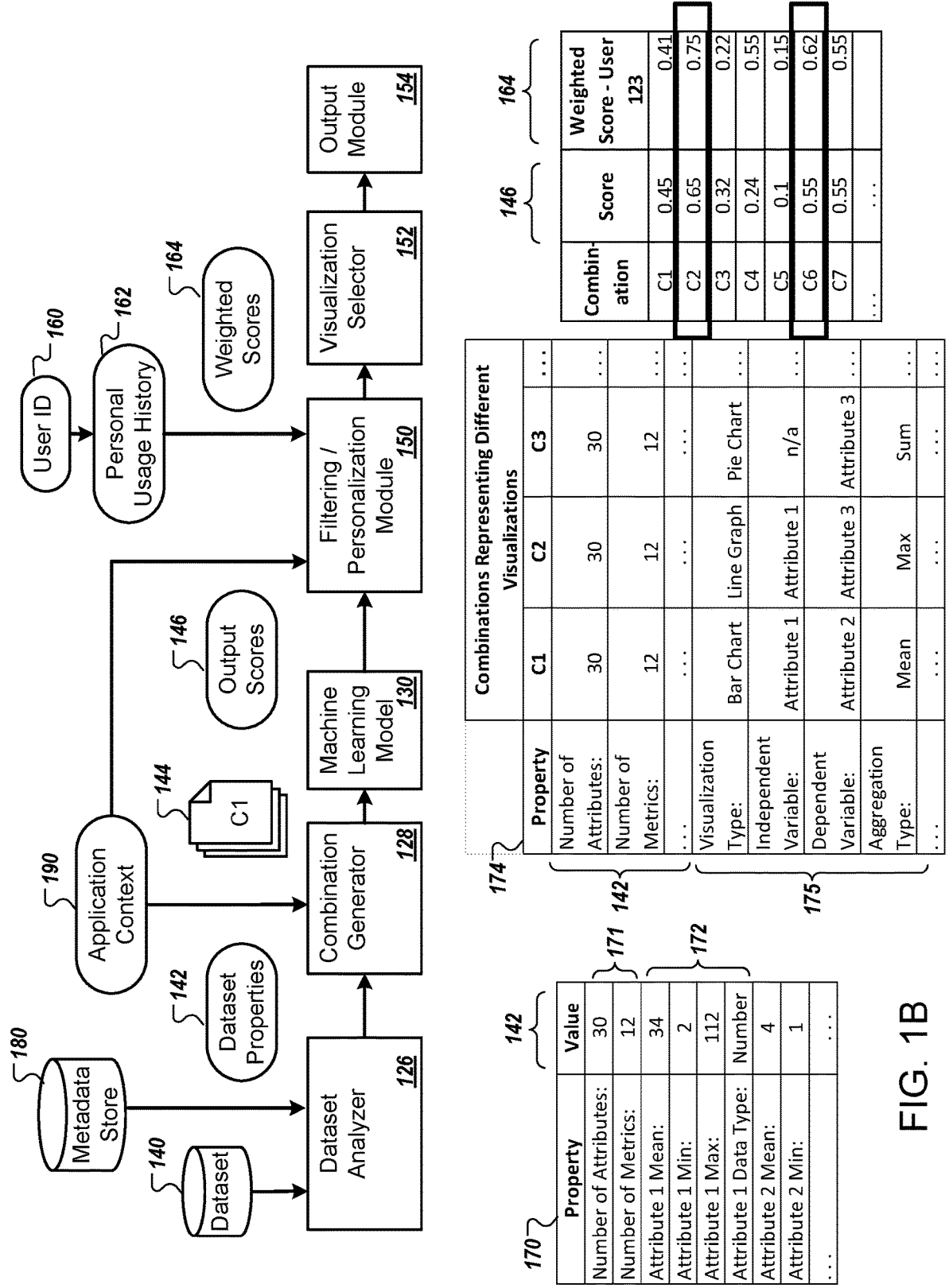

FIGS. 1A-1B are diagrams showing examples of a system 100 that can use machine learning to generate and evaluate visualizations. FIG. 1A shows an example of training a machine learning model 130. FIG. 1B shows an example of using the machine learning model to predictively generate and evaluate visualizations for a dataset.

The system 100 includes a computer system 110 that communicates with various client devices 105 over a network 107. The computer system 110 can be a server that provides an enterprise application, or can be another computer system. The computer system 110 obtains user feedback 116 about visualizations and trains the machine learning model 130 based on that user feedback 116. As discussed further below, the computing system 110 can obtain explicit user feedback, such as survey data 117 indicating responses of users to a survey requesting ratings of visualizations. The computing system 110 can also obtain implicit user feedback, such as usage data 118 that shows how users have accessed, shared, edited, viewed, interacted with, or otherwise used visualizations or documents that include visualizations.

The computer system 110 can provide visualization data 112 to the client devices 105 over the network 107. In some implementations, the computer system 110 generates surveys that display different visualizations 114 created from a data set 124. For any given data set 124, the computer system 110 generates visualizations of different types that illustrate different portions of the data set. For example, if there are 10 different types of visualizations and 30 columns of data, and each visualization type only involves a single column of data, there would be 300 different visualizations generated, one for each combination of visualization type and column. Of course, some visualization types may illustrate data from more than two columns, or may represent different aggregations of data, or may involve different subsets of data with individual columns, which may increase the number of visualizations still further.

In order to determine the set of visualizations to be evaluated, the computer system 110 may use a dataset analyzer 126 to determine different properties of the data set 124. For example, the dataset analyzer 126 may determine properties of the data set 124 such as a number of tables, a number of columns, a number of objects referenced, data types of the columns, ranges of values in the different columns, minimum values for each column, maximum values in each column, statistical measures for values in the columns (e.g., standard deviation, mean value, mode, etc.), and so on.

The properties of the data set 124 are then provided to a combination generator 128 that uses the data set properties to determine a set of visualizations having varying properties. For example, using information about the number of columns and identity of columns in the data set, an exhaustive set of combinations meeting certain predetermined criteria can be determined. For example, if there are 10 visualization types (e.g., bar chart, line chart, scatterplot, etc.) that each involve two columns of data, each of the different permutations of arranging the columns in those visualization types may be determined (e.g., for each visualization type, defining a visualization for column 1 with respect to column 2, column 1 with respect to column 3, . . . column 2 with respect to column 1, column 2 with respect to column 3, and so on). Data types of the columns can be used to determine whether certain types of visualizations should be defined. For example, when a column is determined to include geographic data, visualizations of geographic maps may be generated for that data and combinations with other data in the set (e.g., a visualization of measures of values in column 1 aggregated and mapped by location, another visualization of measures of values in column 2 mapped by location, etc.).

With the full set of visualizations that meet certain predefined criteria, the computer system 110 generates surveys 115 including different groups of the visualizations. For example, of the set of visualizations generated, randomly selected groups of four visualizations may be defined and sent to different client devices 105. Users of the client devices 105 are shown the visualizations in their survey, and controls allowing the users to rate the different visualizations. Results from the survey are provided to the computer system 110 as user feedback 116.

The computer system 110 can also receive user feedback in the form of interaction data as users go about their usual work and interact with visualizations. For example, the computer system 110 may serve visualization data 112 as part of for filling requests for reports, dashboards, documents, and other content. The client devices 105 and/or the computer system 110 can update interaction logs specifying how users interacted with the different visualizations. These logs may indicate parameters such as whether our user interacted with filter controls, and amount of time the visualization was on screen, a number of times that the visualization was accessed or interacted with, and so on. This interaction data captures implicit preferences of the users and can reveal which visualizations result in the most interaction and interest, which in many cases are the most effective visualizations.

For both types of user feedback data 116, e.g., survey data 117 and usage data 118, the computer system 110 stores data indicating the properties of the respective data set that the visualizations were derived from. Thus, the computer system 110 obtains many examples that each include the properties of a visualization, the properties of the data set that the visualization illustrates, and user feedback after users viewed the visualization.

The computer system 110 can aggregate the many data points of user feedback 116 using a preference aggregation module 120. For example, the computer system 110 can determine aggregate scores for visualizations based on a combination of survey responses of different users. As another example, the aggregation module 120 can aggregate many instances of user interaction with specific visualizations viewed by multiple users. Part of this process can include waiting different interaction types to map the data onto a scale reflecting the level of preference. For example, the score for a visualization may be based on a weighted combination of a number of users that interacted with the visualization out of the number of users that viewed the visualization, an average amount of time viewing the visualization, The number of users that shared the visualization with others, and the number of users that shared the visualization with others, and so on.

The computer system 110 then uses a training module 122 to train the machine learning model 130 to predict user preferences for visualizations. The computer system 110 can use data aggregated from the user feedback to generate target scores 134 that represent the relative value or effectiveness indicated by the user feedback. For example, the different visualizations for a particular data set 124 can be assigned overall ratings or rankings based on aggregated user feedback data 116, which can then be used to determine target scores 134. In some implementations, the computer system 110 determines a distribution of target scores over the set of visualizations determined from a particular data set 124.

The machine learning model 130 can include, for example, an artificial neural network, a classifier, a support vector machine, a decision tree, a regression model, a clustering model, a Gaussian process model, a genetic algorithm, and/or a reinforcement learning model. In some implementations, the machine learning model 130 represents a collection of multiple machine learning models, e.g., an ensemble model, that may have different properties or training states.

As one example, the machine learning model 130 may include a neural network that is configured to receive an input vector including combination data 129 that indicates (i) visualization properties, such as a visualization type, and (ii) data set properties of the data set 124 that the visualization's data is taken from. The neural network processes the input data and produces one or more output scores 132 predicting the suitability of the visualization properties provided as input, given (e.g., conditioned on or interpreted in the context of) the data set properties provided as input. The training module can compare the output scores 132 for a visualization/data set combination with the target scores 134 determined based on user feedback for that visualization/data set combination and determine differences or level of error between predicted values (output scores 132) and the target scores 134. The training module 122 updates the parameters of the neural network (e.g., weights for nodes of the neural network) using a technique such as backpropagation.

The computer system 110 may continue to train the machine learning model 130 based on many different visualizations for each of multiple different data sets until a desired performance measure is reached, such as level of error for predictions for a test set of examples being below a threshold.

FIG. 1B shows an example of using the trained machine learning model 130 to automatically define, select, and recommend relevant visualizations for a data set 140. The actions discussed for FIG. 1B can be performed by the computer system 110 of FIG. 1A.

In the example, the computer system 110 identifies a data set 140 to process. This may be done in response to a user selection of the data set with the user interface, or user request to open or import the data set, or another action. In some instances, data sets are processed independent of user action and visualizations are defined and have their properties stored in advance to increase performance when the data set is opened.

The data set analyzer 126 determines properties 142 of the data set 140. For example, the data set analyzer can determine values for each of a predetermined set of characteristics of the data set 140. Table 170 shows an example of a few of these properties. Some of the properties extracted may be structural characteristics of the data set 140 as a whole, such as properties 171 including a number of attributes in the data set 140, a number of metrics in the data set 140, a number of records in the data set 140 and so on. The extracted properties 142 may also include properties 172 of specific portions or subsets within the data set 140. The properties 172 show examples, such as the mean value of a particular column of data, the minimum value within the column, the maximum value within the column, a data type for the column, and so on. These may also include structural or directly observable characteristics of a portion of the data set 140. In other words, at least some of the properties 142 extracted may be independent of the semantic meaning of the elements in the data set 140. These type of properties may be included for each of the different subdivisions of data within the data set 140, for example, a set of properties 172 for each column in the data set 140.

The data set analyzer 126 may also determine other properties 142 of the data set 142, potentially from sources outside the data set 140 itself. For example, the data set analyzer 126 may retrieve information about the data set 140 and specific subsets of the data set 140 from a metadata store 180. The retrieved metadata may indicate labels for data objects in the data set 140, keywords, and other semantic information about the meaning of different portions of the data set 140.

The system provides the data set properties 142 to a combination generator 128, which generates the specifications of candidate visualizations for the dataset by determining various different combinations 144 of visualization formats and subsets of the data set 140. These combinations 144 include information indicating the data set properties 142 as well as visualization specification information that specifies how portions of the data set 140 would be represented in a specific visualization. This information may be represented using a feature vector for each combination (e.g., each candidate visualization being considered).

A table 174 shows examples of three different combinations C1, C2, C3. Each combination represents a candidate visualization for the data set 140 and can be represented by a vector of information that includes some or all of the data set properties 142 as well as an indication of visualization characteristics 175. In the example, the combination C1 specifies a bar chart having attribute one from the data set 140 as the independent variable, attribute to from the data set 140 as a dependent variable, and with data from attribute to being aggregated using a main function. The combination C2 specifies a line graph in which attribute one is the independent variable, attribute three is a dependent variable, and data from attribute 3 is represented with the maximum value. Combination C3 specifies a pie chart in which data from attribute 2 is summed and illustrated in the chart.

In many cases, a large number of combinations can be generated. For example, there may be many different chart types, and many different permutations of different data subsets that may be illustrated with each of those chart types. Similarly the orientations of the charts and other presentation aspects can be varied to produce additional combinations, the number of data points, the placement of a value as a dependent or independent variable, and many other aspects of the charts can be varied to produce for their combinations.

Each of the generated combinations 144 is evaluated using the trained machine learning model 130. For example, each combination can have a corresponding feature vector defining the properties shown in the table 174. These feature vectors can each represent a set of input to the machine learning model 130 that causes the machine learning model 130 to produce an output score 146 for the visualization defined in the input feature vector. Due to the training of the machine learning model 130 and the input specifying both the characteristics of the data set and the characteristics of the candidate visualization being assessed, the machine learning model 130 can output a score indicating a predicted level of relevance or usefulness of the visualization having those properties, given the properties of the data set 140.

The machine learning model 130 is used to determine a score for each of the candidate visualizations (e.g., as defined by combinations C1, C2, C3 that each represent different sets of visualization properties 175). Those scores can then be adjusted or combined with additional scores using a filtering and personalization module 150. The output scores 146 indicate the predicted relevance of the different candidate visualizations. The filtering and personalization module 150 can personalize the predictions of relevance by taking into account further information such as a profile for the user, preferences of the user, a history of prior queries of a user, a history of prior interactions of the user with an application, and so on. The computer system 110 can identify the current user, for example, using a user identifier 160 such as an identifier for a user account of the user, which can be provided when the user logs into an application or a service provided by the computer system 110. The computer system 110 uses the user identifier 160 to retrieve a personal usage history 162 for the user, as well as other information such as information indicating contents of a personal library of documents for the user. From this retrieved information, the computer system 110 can determine topics of interest of the user, keywords and queries submitted by the user, actions the user took previously to accept or reject recommendations of visualizations, and so on. The computer system 110 can also access information about a role of the user in an organization, a hierarchy or departmental structure of the organization, and so on to further personalize the assessment of relevance of the different visualizations for the user.

As an example, the usage history 162 for the user may indicate that the user is an engineer, has used recommended line graphs, and has documents related to failure rates in a personal document collection. As a result, the personalization module 150 can adjust the output scores 146 to apply a boost or weighting that increases the relevance of candidate visualizations that are line graphs or that include data relating to failure rates. For another user, the weighting may be different. For example, for the same data set 140, a user in the finance department may frequently add sales information when creating documents, and as a result, the personalization module 150 can boost the relevance of visualizations relating to sales data (or to financial data in general) based on this other user's role and usage history. In this manner, the predicted relevance of candidate visualizations and ultimately the selection of recommended visualizations can be personalized for different users.

Figure 3:
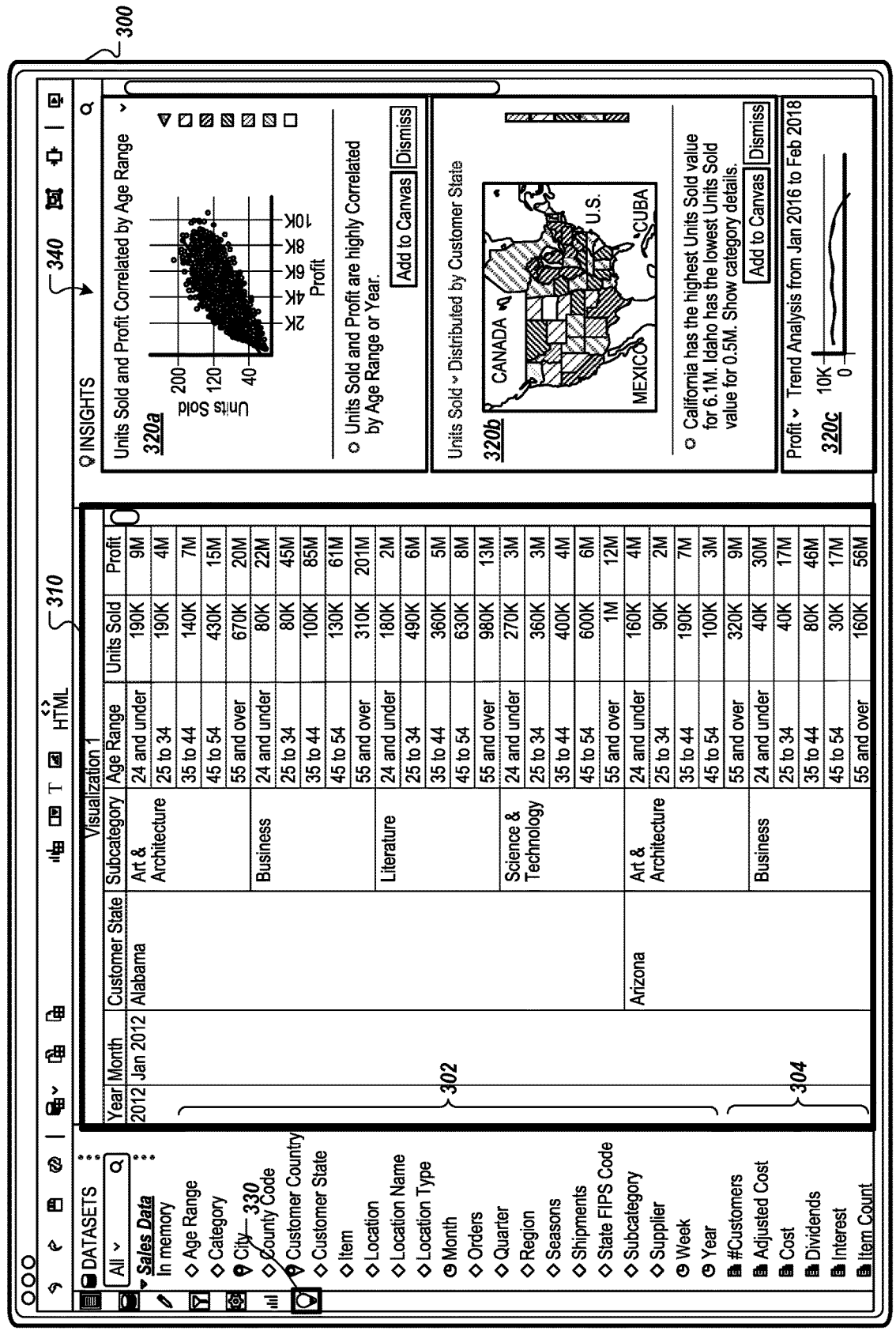
Figure 4:
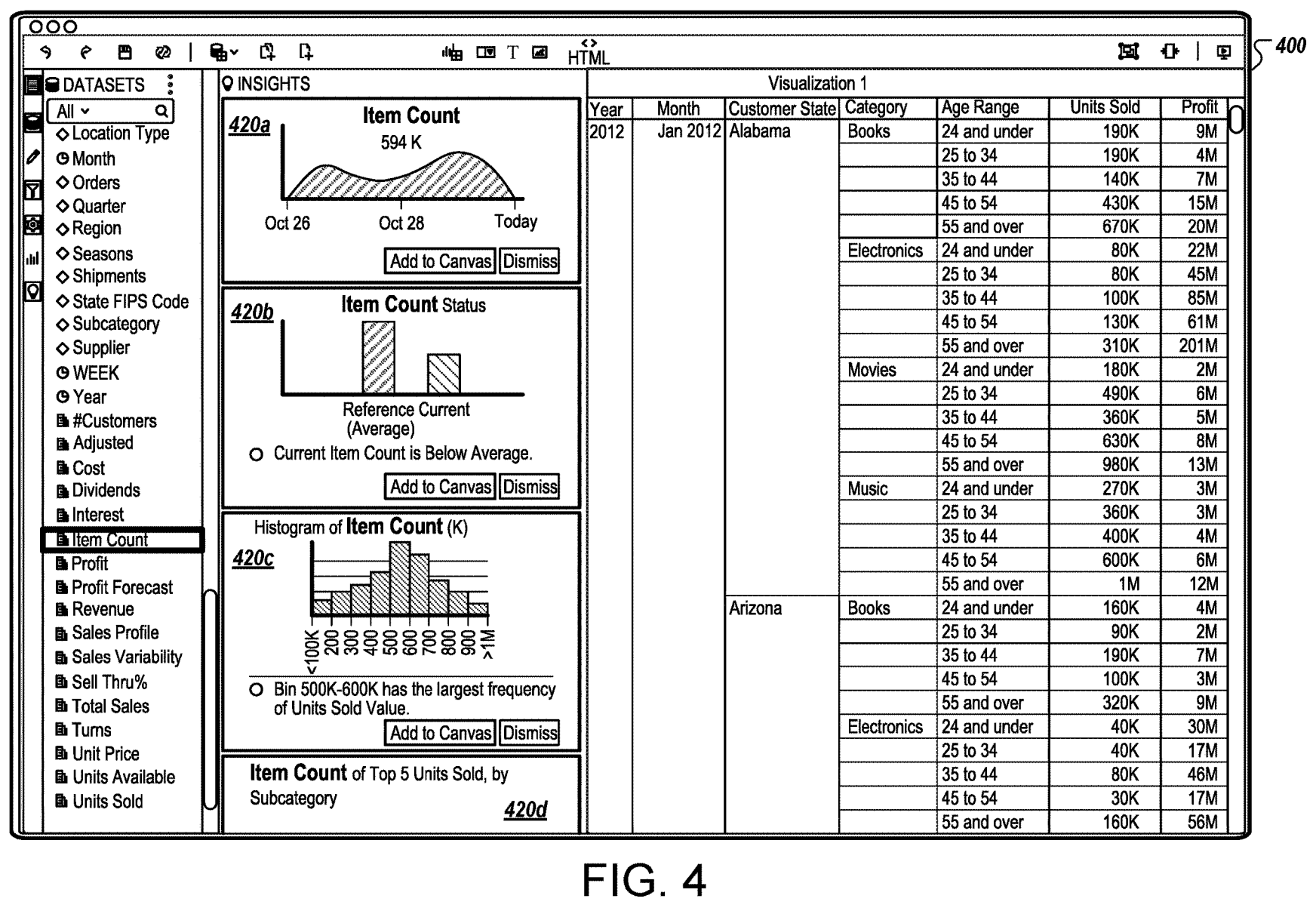
Figure 5:
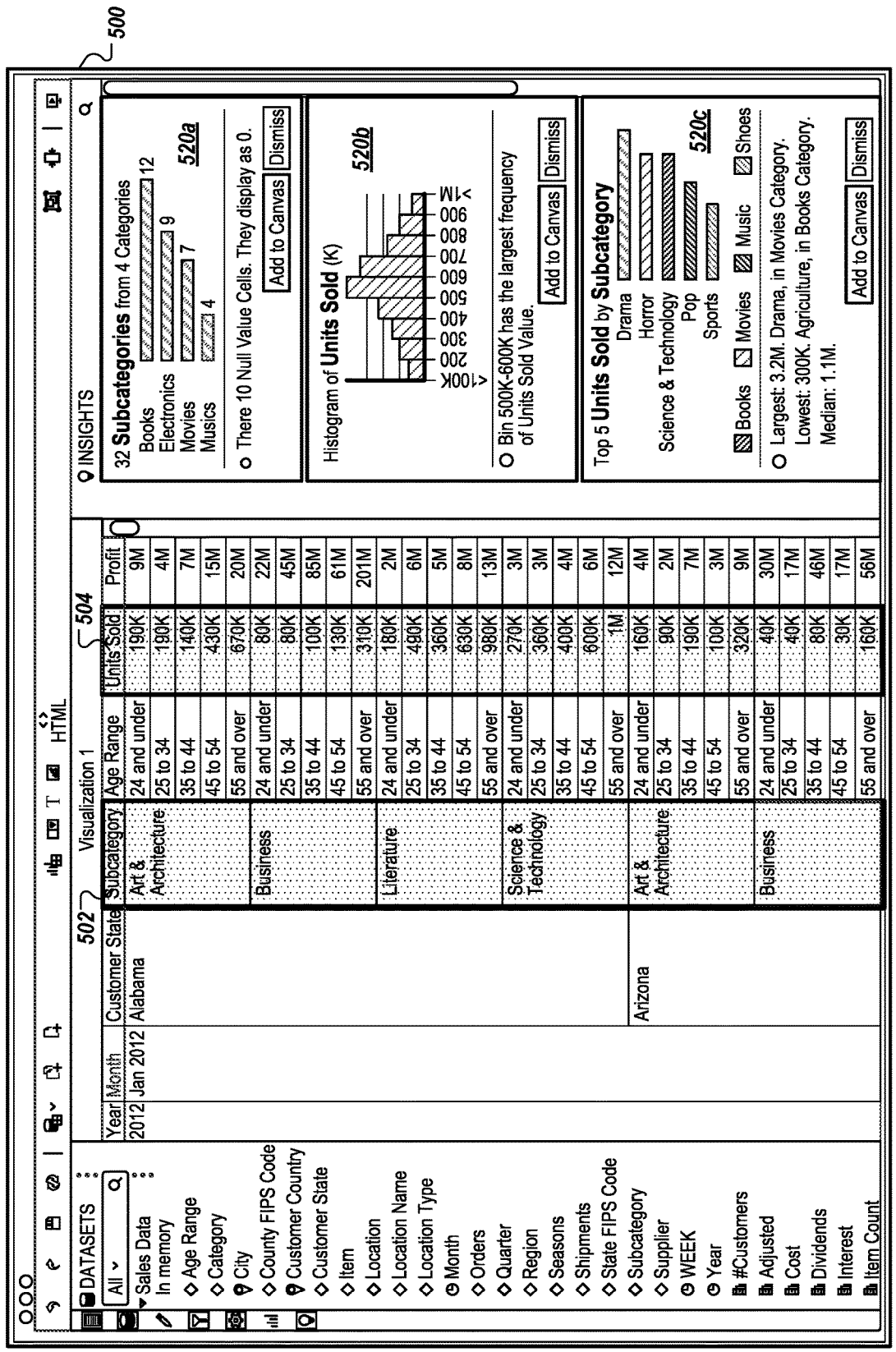

The filtering and personalization module 150 can also adjust scores or filter the set of candidate visualizations based on application context 190. The application context 190 may include currently active selections on a user interface of an application, such as the selection of one or more columns of the data set 140, selection of a range of records of the data set 140, selection of certain data objects (e.g., attributes or metrics), and so on. Application context 190 may also include terms or elements present in a user interface even if not selected, a task being performed with an application, a set of object in a document being edited, and so on. From the application context 190, the filtering and personalization module 150 may determine topics, data types, or visualization types and apply weights to adjust the output scores 146 for candidate visualizations in the same way that is done for the information in the usage history 162. In addition, the candidate visualizations can be filtered, for example, to remove candidate visualizations that do not relate to current selections on a user interface. Examples of using application context 190 are shown in FIGS. 3-5.

The output of the filtering and personalization module 150 is a set of weighted scores 164 indicating the personalized relevance of at least candidate visualizations that have not been filtered out. Using these weighted scores 164, a visualization selector 152 selects a subset of the candidate visualizations to be provided for display. For example, the visualization selector 152 can identify the candidate visualizations for which the associated weighted scores 164 indicate the highest relevance. The visualization selector 152 may rank the candidate visualizations based on the weighted scores 164 and then select a particular number of the highest-ranking candidate visualizations. As another example, the visualization selector 152 may select candidate visualizations that have weighted scores that satisfy a threshold, e.g., indicate a relevance that meets or exceeds a minimum level. In the example, the property combinations C2 and C6 are identified as having the highest weighted scores 164 and thus the highest relevance given the properties of the data set, the application context 190, and the usage history 162 for the user. The two candidate visualizations defined by these combinations are then selected as visualizations to recommend and provide for output on a user interface.

The selected visualizations are indicated to an output module 154. The output module may provide visualization data to a client device 105 enabling the client device 105 to display the selected visualizations.

A number of variations of the techniques described above can be used. For example, different configurations of the machine learning model 130 may be used. For example, rather than indicate a score or rating for a visualization whose properties are provided as input to the model 130, a machine learning model may be trained to receive dataset properties and provide a distribution of scores across various visualization type labels. For example, if there are ten possible types of visualizations, the machine learning model may output ten scores, one for each of the ten types of visualizations to indicate the relative suitability of the ten types of visualizations. As another variation, a set of classifiers may be trained, where each classifier represents a particular visualization property, such as visualization type. For example, one classifier may be trained to predict the usefulness of a bar chart type based on data set properties, another classifier may be trained to predict the usefulness of a line graph type based on data set properties, and so on.

Figure 2:
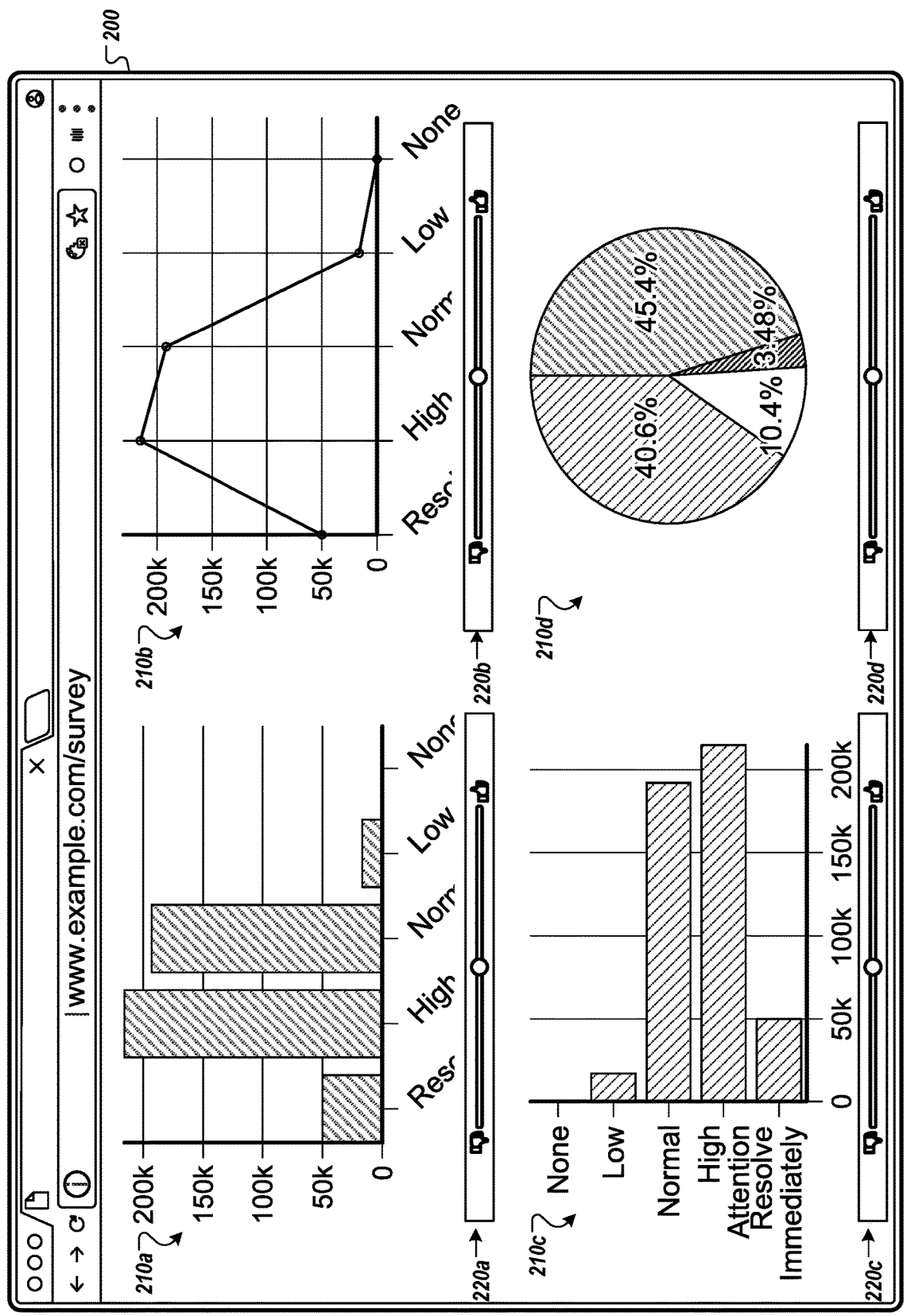
FIG. 2 is a diagram showing a user interface for obtaining user feedback.

FIG. 2 illustrates an example of a user interface 200 for providing a survey to a user. The survey may be provided through a webpage or web application, as shown in the example, or may be provided by an application on a client device.

The survey includes several different visualizations 210a-210d, each of which has a different combination of visualization properties and/or shows different information from a data set. The user interface 200 also includes controls 220a-220d that allow a user to enter a rating for each visualization 210a-210d.

Surveys may be generated from any data set to show possible visualizations. In some cases, the data set and or the types of visualizations are randomly determined. For example, a data set with randomized data may be used, with or without labels for the data, so that the visualizations 210a-210d will be rated based on the visual properties shown and the nature of the relationships among the values in the data set, rather than semantic meanings or labels for the data.

In some cases, surveys may include different visualizations 210a-210d that represent the same or similar portions of a data set. For example, in some cases, surveys may include different visualizations 210a-210d that represent the same or similar portions of a data set. For example, the four visualizations 210a-210d each illustrate relationships between two data objects, labels for a set of categories and counts of items in the different categories. Each of the visualizations 210a-210d show these elements in a somewhat different manner. The visualization 210a is a bar chart that shows the category labels along the horizontal axis, with item counts indicated along the vertical axis. The visualization 210b has the same axes but shows the data in a line graph. The visualization 210c is a bar chart that has the axes reversed compared to visualization 210a. The visualization 210d is a pie chart that shows the item count data in percentages rather than in counts. Accordingly, each of the visualizations 210a-210d is derived from the same portion of the data set (e.g., a column showing category labels for different records) but the visualization type, formatting, or level of aggregation or abstraction of the data is different for each visualization 210a-210d.

In some instances, surveys based on a particular data set can be provided to many different users. Some users may receive the same set of visualizations in their surveys. Some users may receive different combinations of visualizations. For example, the visualizations 210a-210d may represent four of twenty different possible visualizations for a portion of the data set. Different users may be shown different combinations of the twenty visualizations (e.g., different subsets of the visualizations arranged in different placements relative to each other). Varying the content and arrangement of the surveys can avoid structural bias in the survey process, as the results from these surveys are averaged and do not represent any bias from a single arbitrary presentation of certain visualizations being placed with the same other surrounding visualizations. In addition, presenting combinations of different visualizations together in surveys may be helpful to give users an implicit reference in the form of the other visualizations. Even without explicitly stating the relative value of one visualization relative to another, the ratings assigned for a visualization while viewing other visualizations may influence the viewer's ratings, and the combined aggregate ratings may reflect the generalized effect of the visualizations being considered in the context of different sets of other visualizations.

FIG. 3 shows an example of a user interface 300 for providing visualizations selected using machine learning. The user interface 300 shows properties of a particular data set, referred to as "Sales Data", that the user has opened using an application. The data set has a number of data objects represented in the data, such as attributes 302 and metrics 304. Each of these data objects may represent a column of data (e.g., such as a column in a table of the data set), a group of records, a set of values of a certain type taken from multiple records, or another portion of the data set. In the example, there are attributes 302 such as age range, category, city, county code, and so on. There are also metrics 304 such as a number of customers, adjusted cost, cost, dividends, interest, item count, and so on. In some cases, the metrics 304 may represent explicit sets of data values stored in the data set. As an alternative, the metrics 304 may represent quantities derived from the data set, such as results of functions applied to data in the data set.

The user interface 300 shows data from the data set in region 310. For example, this region 310 shows data objects representing a year, month, customer state, subcategory, age range, units sold, and profit. The user has provided user input to select the region 310, which may be a container or group of data in the interface. Because of this selection, the system identifies each of the data objects represented in this region 310 and considers those data objects for generating visualizations. Visualizations that do not relate to any of the data objects in the selected region 310 may be omitted as not relevant to the current state or current context of the application. In other words, user selections of a portion of the data set can act as a filter to automatically limit the sets of visualizations shown. More generally, information about the current context and state of a device or application can be used by the system to generate, filter, score, rank, and suggest visualizations.

With the selection of the region 310, there are multiple data objects that the system considers to be relevant, in particular, a total of seven different columns representing attributes and metrics. Of course, in finding these data objects relevant the system need not require visualizations to include all of those columns, and similarly some visualizations may combine data for these selected data objects with other data objects that may not be selected. Typically, a single visualization may not effectively illustrate the relationships among so many characteristics of a data set. The system can use the machine learning model to automatically select a subset of the attributes/metrics and appropriate visualizations for those subsets. As discussed above, this can be done by evaluating many different combinations of visualization formats and data subsets, e.g., evaluating each combination of one of the selected data objects with each of several visualization formats, evaluating each different combination of two of the selected data objects with each of the visualization formats, evaluating different combinations of three of the selected data objects with each of the visualization formats, and so on. These combinations may vary other properties as well, such as which data object represents an independent or dependent axis, different levels of aggregation or subdivision of elements corresponding to a data object, and so on.

As an example, the training of the machine learning model based on surveys and or other user interactions may capture preferences of users. The machine learning model may have learned that the most preferred visualizations typically involve only two or three different attributes or metrics from a data set.

In the example, the system provides several visualizations 320 that are predicted to be most useful by the machine learning model. The output of the machine learning model may also be further adjusted or personalized for a specific identified user of the application as discussed above. The visualizations displayed show that the machine learning model has identified different types of visualizations as being best for different combinations of the data objects represented within the selected region 310. For example, a first visualization 320a is a scatterplot illustrating units sold and profit correlated by age range, with profit as the horizontal axis, units sold as the vertical axis, and data points being color-coded according to a key. The visualization 320a is also accompanied with text that the system generated to indicate a relationship that the system determined for the three attributes/metrics illustrated (e.g., units sold, profit, and age range).

A second visualization 320b shows a different type of visualization, a geographical map, as well as different attributes/metrics which in this in this case are units sold and customer state. The text accompanying the visualization 320b is an indication of particular statistical features of the portion of data set represented in the visualization 320b, in particular, an indication of the highest and lowest values for units sold as aggregated by customer state. Another visualization 320c shows yet different elements of the data set in the selected region 310, e.g., profit levels over a certain range of time. The visualizations 320a-320c represent those that the machine learning model predicted to be most useful given the characteristics of the data set.

The visualizations 320a-320c may be presented in response to any of various user actions or settings of an application. For example, a panel or region of the user interface 300 may remain open and dynamically populate with different sets of visualizations that change as user changes the active selections of data sets and portions within the data sets. This is shown as the "insights" panel on the right side of the user interface 300. As another example, the user interface 300 may include a control 330 that a user can interact with to trigger the display of visualizations 320a-320c. For example, the control 330 may be tapped or clicked to initiate the display of the visualizations 320a-320c. Before the user interacts with the control, the system may evaluate visualizations and filter them according to the users selections on the user interface 300 or based on other aspects of the user interface 300 (e.g., text showing on screen, a task, a portion of the application being used, etc.). The application may even predictively retrieve data for the visualizations 320a-320c, render the visualizations 320a-320c, cache data for the visualizations 320a-320c, or take other steps to improve responsiveness and minimize latency in response to user interaction with the control 330.

The user interface 300 includes controls associated with the visualizations 320a-320c which allow the user to act on the recommendations shown. For example, each of the visualizations. As a button "add to canvas" that a user can interact with to insert the corresponding visualization 330 into a document or workspace for later use. Each visualization 320a-320c also has a button labeled "dismiss" to remove the visualization 320a-320c from view. In response, the system may remove the dismissed item and populate the visualization area with the next most relevant visualization, as predicted using the machine learning model.

When a user dismisses a visualization, or adds a visualization to a document or workspace, or otherwise interacts with a visualization, that feedback may be used to improve future performance of the system. For example, dismissing a visualization can be logged and used to further train the machine learning model to give better prediction used to improve future performance of the system. For example, dismissing a visualization can be logged and used to further train the machine learning model to give better predictions. In addition, or as an alternative, the information may be stored in a personalized usage history for the user and later used to weight output of the machine learning model based on the user preferences. For example, if a user adds a map to a document but dismisses a scatterplot, the system may learn to assign lower weightings to visualizations of the scatterplot type and so demote those visualizations for the particular user even if the machine learning model indicates high relevance of a scatterplot generally based on characteristics of the dataset. The system can also use the usage history to assign higher ratings to visualizations of a geographical map type, to promote or boost the relevance of those visualizations for the particular user.

FIG. 4 shows an example of another user interface 400 showing visualizations predicted using machine learning. Like the user interface 300 of FIG. 3, the user interface 400 shows an application with a data set that has been opened or imported for use. In this example, the user has selected a specific metric from the dataset, "item count." As a result, the system filters the set of possible visualizations for the data set (e.g., a set of generated visualization specifications) to limit the set of candidates to those that involve or illustrate the selected metric. The visualizations that the system protects to be relevant each illustrate the item count data in a different manner, e.g., with a different visualization type, a different data aggregation, different formatting, and so on. The visualization 420a illustrates an area chart showing item count over time. The visualization 420b illustrates an aggregate measure of item counts with respect to a reference or average item count, shown in a bar chart format. The visualization 420c shows a histogram of the item count data quantized so that bars representing certain intervals or bins. The visualization for 420d shows item count data with respect to other data objects that were not specifically selected, e.g., units sold and subcategory.

As noted above, the set of possible visualization specifications for a data set can be generated and assigned scores using a machine learning model when a data set is opened or imported, or even earlier during a previous session or a data preprocessing step. As a result, as a user selects different data objects or combinations of data objects, the system can quickly select and provide the visualizations relevant for the updated selections. Frequently, the set of appropriate visualizations can be done by simply filtering the set of candidate visualizations based on the user selections and/or adjusting a scoring or ranking of the candidates.

FIG. 5 shows another example of a user interface 500 showing visualizations predicted using machine learning. In the example, a user has selected two columns of data from a data set, e.g., a "subcategory" column 502 and a "units sold" column 504. The system uses these selections to customize the set of recommended visualizations to the user's expressed interest in these specific portions of the data set. As discussed above, the formats of the visualizations and any additional portions of a data set that are represented in the visualizations may be determined based on the predictions of a machine learning model.

In the example, three visualizations 510a-510c are shown. The visualization 510a shows an indication of subcategories and a count of occurrence of the subcategories in a horizontal bar chart. The visualization 510b shows a histogram of "units sold" data from column 504. The visualization 510c indicates data from the units sold column 504, with the data aggregated according to subcategories from the "subcategory" column 502. As with other visualizations that the system recommends, the system automatically determines each of the properties of the visualizations 510a-510c that are recommended. The properties are not limited to the selection of data objects represented or the visualization type. Rather, the system may determine factors such as the number of elements indicated on a chart, the size or number of bins for a histogram, which type of tabular aggregation to use (e.g., mean, median, mode, maximum, minimum, etc.), and so on.

Figure 6:
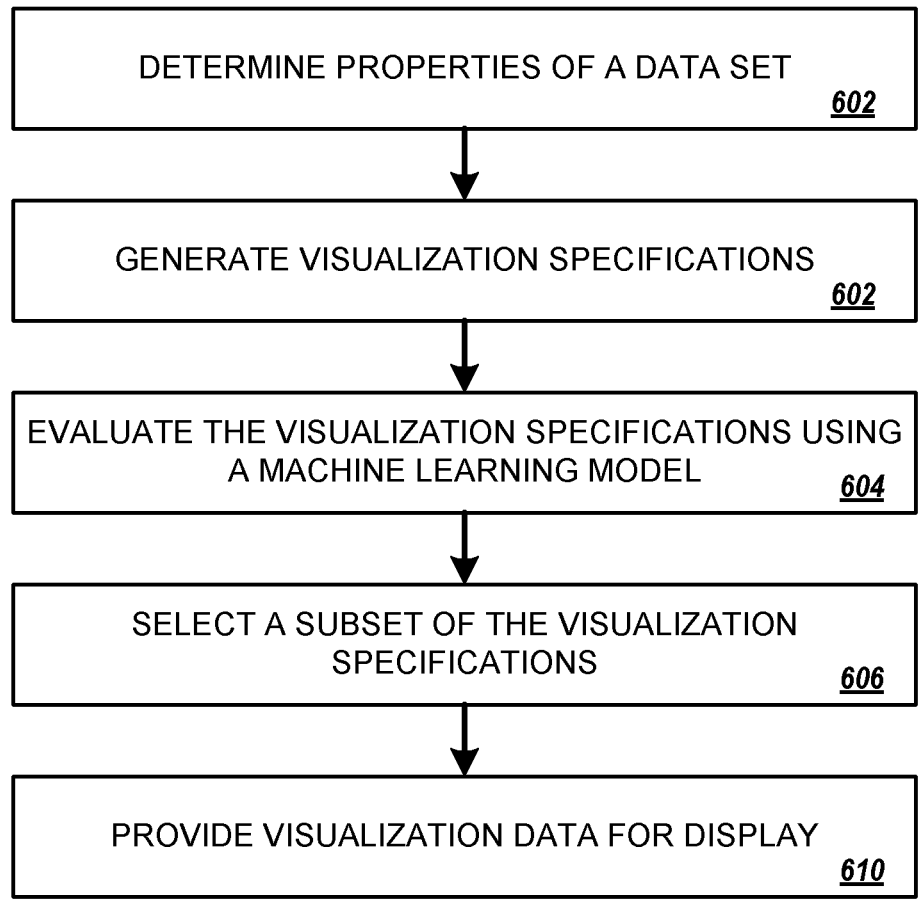
FIG. 6 is a flow diagram showing an example of a process for machine learning to generate and evaluate visualizations.

FIG. 6 is a flow diagram showing an example of a process 600 for machine learning to generate and evaluate visualizations. The process 600 can be performed by one or more computers, such as the computer system 110. The process 600 can be performed by a client device, a server system, or with operations being split and/or shared between a client device and a server system.

The one or more computers determine properties of a dataset (602). Determining properties of the dataset can include determining structural properties of the dataset including at least one of a number of columns, a number of attributes, a number of metrics, a value for an aggregation for a data range, a span of values for a data range, a data type for a data range, or a statistical measure for a data range. Determining properties of the dataset can include determining semantic properties of the dataset.

The one or more computers generate visualization specifications that each define a different visualization for the dataset (604). The visualization specifications can specify different subsets of the dataset being illustrated with different visualization formats. The different visualization formats comprise different visualization types including two or more from the group consisting of a graph, a line chart, a bar chart, a pie chart, a scatterplot, a heat map, a geographical map, a word-size map, a bubble chart, a hierarchy chart, a waterfall chart, a radar chart, a statistical chart, and an area chart.

The one or more computers evaluate the visualization specifications using a machine learning model trained based on user feedback for visualizations for multiple datasets (606). In some implementations, the trained machine learning model has been trained to output scores indicating a level of usefulness of visualizations. The scores are conditioned on properties of the datasets the visualizations are derived from. The machine learning model can be configured to generate the scores based on input indicating visualization properties and dataset properties, and the trained machine learning model can be one that was trained based on user feedback data indicating actions of multiple users after being presented visualizations representing portions of different datasets. The user feedback data can include, for example, survey responses indicating ratings that users applied to visualizations, and/or usage data comprising measures of user behavior (other than ratings of visualizations) in response to the presentation of the visualizations. The user behavior data can indicate, for example, whether and to what extent users interacted with different visualizations. The usage data may include at least one of: a number of times a visualization was viewed, interacted with, shared, or included in a document by one or more users; or an amount of time that a visualization was viewed or interacted with by one or more users.

Evaluating the visualization specifications can include, for each of the visualization specifications, providing, to the trained machine learning model, input that indicates (i) properties of a visualization and (ii) properties of the dataset. For each visualization specification a score for the visualization can be received as output of the trained machine learning model.

The machine learning model may include an artificial neural network, a classifier, a support vector machine, a decision tree, a regression model, a clustering model, a Gaussian process model, a genetic algorithm, or a reinforcement learning model.

The one or more computers select a subset of the visualization specifications based on output of the machine learning model (608). Selecting a subset of the visualization specifications can include: ranking the visualization specifications based on the scores provided as output of the machine learning model; and selecting a highest-ranking subset of the visualization specifications.

The selection of the visualization specifications can be personalized for a user. For example, the selection of the visualization specifications can be personalized based on a data type, a keyword, a visualization type, a query, or a topic indicted by usage data for the user. Selecting the subset of the visualization specifications can include: determining scores for the visualization specifications based on output of the machine learning model; weighting one or more of the scores based on the identity of the user to obtain a set of weighted scores for the visualization specifications; and selecting the subset of the visualization specifications based on the weighted scores.

The one or more computers provide visualization data for display (610). The visualization data corresponds to the selected subset of the visualization specifications selected based on the output of the machine learning model. The visualization data can be provided in any appropriate form, e.g., as image data, markup language, as data to be rendered by a client device, scripting language or executable code, and so on. In some cases, the visualization specifications and data from the data set can be provided for a device to generate (e.g., render) appropriate visualizations and display them. The visualization data can be sufficient to allow a device (e.g., the one or more computers or another device) to display visualizations according to the visualization specifications. The visualization data can be provided from a server to a client device over a network, such as the Internet. In some implementations, the selection of visualizations and presentation can occur locally so that transfer over a network is not required.

In some implementations, the one or more computers receive data indicating interaction with a control on a user interface. The visualization data can be provided in response to receiving the data indicating the interaction with the control on the user interface. Evaluating the visualization specifications using the machine learning model can be performed before receiving the data indicating the interaction with the control. The control may be one for requesting suggested visualizations. As an alternative, the control may be simply a control for initiating the creation of a visualization or other object, without specifying a desire for visualizations. The control may be for another purpose, such as to create a new page or new document, and without requesting visualizations, the visualizations can be provided as suggestions of items to include in the document. In general, any control (e.g., for opening a data set, opening a document, editing a document, etc.) can trigger the suggestion of visualizations. In some implementations, simply selecting one or more portions of a data set can trigger the selection and presentation of suggested visualizations based on the selected one or more portions of the data set.

In some implementations, the one or more computers determine a portion of the data set that has been selected using the user interface. This portion may be a data item such as an attribute, metric, record, value, table, column, or field, or groups or ranges of these data items. These may be selected through interaction on a graphical user interface (e.g., clicking, highlighting, tapping, etc.) or through another interface (such as specifying columns or other portions using a voice interface). Selecting the subset of the visualization specifications can include filtering the visualization specifications to exclude one or more visualization specifications that do not represent the determined portion of the data set.

In some implementations, determining that a portion of the data set has been selected includes determining that a column of the data set has been selected. Selecting the subset of the visualization specifications comprises selecting only visualization specifications that are generated from or provide information regarding the selected column.

In some implementations, the one or more computers identify a user of a computing device, e.g., based on a username and password, authentication token, digital certificate, user account, etc. Selection of the subset of the visualization specifications can be personalized based on the identity of the user of the computing device. Providing the visualization data can include providing the visualization data to the computing device for display by the computing device.

In some implementations, the one or more computers identify one or more topics based on a role of the user, a user profile for the user, or a usage history for the user. Selecting the subset of the visualization specifications is personalized by adjusting scores for the visualization specifications to indicate increased relevance for visualization specifications associated with the one or more topics.

In some implementations, the one or more computers determine, based on a usage history for the user, one or more visualization formats with which the user previously interacted. Selecting the subset of the visualization specifications can be personalized by adjusting scores to indicate increased relevance for visualization specifications specifying visualization formats that have at least a minimum level of similarity to the one or more visualization formats with which the user previously interacted.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A method performed by one or more computers, the method comprising:
   determining, by the one or more computers, properties of a dataset;
   generating, by the one or more computers, visualization specifications that each define a different visualization for the dataset, wherein the visualization specifications specify different subsets of the dataset being illustrated with different visualization formats;
   evaluating, by the one or more computers, the visualization specifications using a machine learning model trained based on user feedback for visualizations for multiple datasets;
   selecting, by the one or more computers, a subset of the visualization specifications based on output of the machine learning model; and
   providing, by the one or more computers, visualization data for display, the visualization data corresponding to the selected subset of the visualization specifications selected based on the output of the machine learning model.

2. The method of claim 1, wherein determining properties of the dataset comprises determining structural properties of the dataset including at least one of a number of columns, a number of attributes, a number of metrics, a value for an aggregation for a data range, a span of values for a data range, a data type for a data range, or a statistical measure for a data range.

3. The method of claim 1, wherein determining properties of the dataset comprises determining semantic properties of the dataset.

4. The method of claim 1, wherein the different visualization formats comprise different visualization types including two or more from the group consisting of a graph, a line chart, a bar chart, a pie chart, a scatterplot, a heat map, a geographical map, a word-size map, a bubble chart, a hierarchy chart, a waterfall chart, a radar chart, a statistical chart, and an area chart.

5. The method of claim 1, wherein the trained machine learning model has been trained to output scores indicating a level of usefulness of visualizations, where the scores are conditioned on properties of the datasets the visualizations are derived from, wherein the machine learning model is configured to generate the scores based on input indicating visualization properties and dataset properties, wherein the trained machine learning model has been trained based on user feedback data indicating actions of multiple users after being presented visualizations representing portions of different datasets.

6. The method of claim 5, wherein the user feedback data comprises survey responses indicating ratings that users applied to visualizations.

7. The method of claim 5, wherein the user feedback data comprises usage data comprising measures of user behavior, other than rating of visualizations, in response to the presentation of the visualizations.

8. The method of claim 7, wherein the usage data comprises at least one of:
a number of times a visualization was viewed, interacted with, shared, or included in a document by one or more users; or
an amount of time that a visualization was viewed or interacted with by one or more users.

9. The method of claim 1, wherein evaluating the visualization specifications comprises:
for each of the visualization specifications:
providing, to the trained machine learning model, input that indicates (i) properties of a visualization and (ii) properties of the dataset; and
receiving, as output of the trained machine learning model, a score for the visualization;
wherein selecting a subset of the visualization specifications comprises:
ranking the visualization specifications based on the scores provided as output of the machine learning model; and
selecting a highest-ranking subset of the visualization specifications.

10. The method of claim 1, comprising receiving data indicating interaction with a control on a user interface; and
wherein providing the visualization data is performed in response to receiving the data indicating the interaction with the control on the user interface.

11. The method of claim 10, further comprising determining a portion of the data set that has been selected using the user interface;
wherein selecting the subset of the visualization specifications comprises filtering the visualization specifications to exclude one or more visualization specifications that do not represent the determined portion of the data set.

12. The method of claim 11, wherein determining that a portion of the data set has been selected comprises determining that a column of the data set has been selected; and
wherein selecting the subset of the visualization specifications comprises selecting only visualization specifications that are generated from or provide information regarding the selected column.

13. The method of claim 1, wherein the machine learning model comprises an artificial neural network, a classifier, a support vector machine, a decision tree, a regression model, a clustering model, a Gaussian process model, a genetic algorithm, or a reinforcement learning model.

14. The method of claim 1, further comprising identifying a user of a computing device;
wherein selecting the subset of the visualization specifications is personalized based on the identity of the user of the computing device; and
wherein providing the visualization data comprises providing the visualization data to the computing device for display by the computing device.

15. The method of claim 14, further comprising identifying one or more topics based on a role of the user, a user profile for the user, or a usage history for the user;
wherein selecting the subset of the visualization specifications is personalized by adjusting scores for the visualization specifications to indicate increased relevance for visualization specifications associated with the one or more topics.

16. The method of claim 14, further comprising determining, based on a usage history for the user, one or more visualization formats with which the user previously interacted;
wherein selecting the subset of the visualization specifications is personalized by adjusting scores to indicate increased relevance for visualization specifications specifying visualization formats that have at least a minimum level of similarity to the one or more visualization formats with which the user previously interacted.

17. The method of claim 10, wherein evaluating the visualization specifications using the machine learning model is performed before receiving the data indicating the interaction with the control.

18. A system comprising:
one or more computers; and
one or more computer-readable media storing instructions that, when executed by the one or more computers, cause the one or more computers to perform operations comprising:
determining, by the one or more computers, properties of a dataset;
generating, by the one or more computers, visualization specifications that each define a different visualization for the dataset, wherein the visualization specifications specify different subsets of the dataset being illustrated with different visualization formats;
evaluating, by the one or more computers, the visualization specifications using a machine learning model trained based on user feedback for visualizations for multiple datasets;
selecting, by the one or more computers, a subset of the visualization specifications based on output of the machine learning model; and
providing, by the one or more computers, visualization data for display, the visualization data corresponding to the selected subset of the visualization specifications selected based on the output of the machine learning model.

19. The system of claim 18, wherein the trained machine learning model has been trained to output scores for visualizations, wherein the trained machine learning model is configured to generate a score for a visualization with respect to a dataset based on input indicating (i) properties of the visualization and (ii) properties of the dataset.

20. The system of claim 18, wherein the trained machine learning model has been trained based on examples of actions that users performed after being presented one or more visualizations, wherein at least some of the examples respectively indicate actions performed after presentation of visualizations for different data sets.

21. One or more non-transitory computer-readable media storing instructions that, when executed by the one or more computers, cause the one or more computers to perform operations comprising:

determining, by the one or more computers, properties of a dataset;

generating, by the one or more computers, visualization specifications that each define a different visualization for the dataset, wherein the visualization specifications specify different subsets of the dataset being illustrated with different visualization formats;

evaluating, by the one or more computers, the visualization specifications using a machine learning model trained based on user feedback for visualizations for multiple datasets;

selecting, by the one or more computers, a subset of the visualization specifications based on output of the machine learning model; and providing, by the one or more computers, visualization data for display, the visualization data corresponding to the selected subset of the visualization specifications selected based on the output of the machine learning model.

\* \* \* \* \*